UNITED STATES PATENT OFFICE.

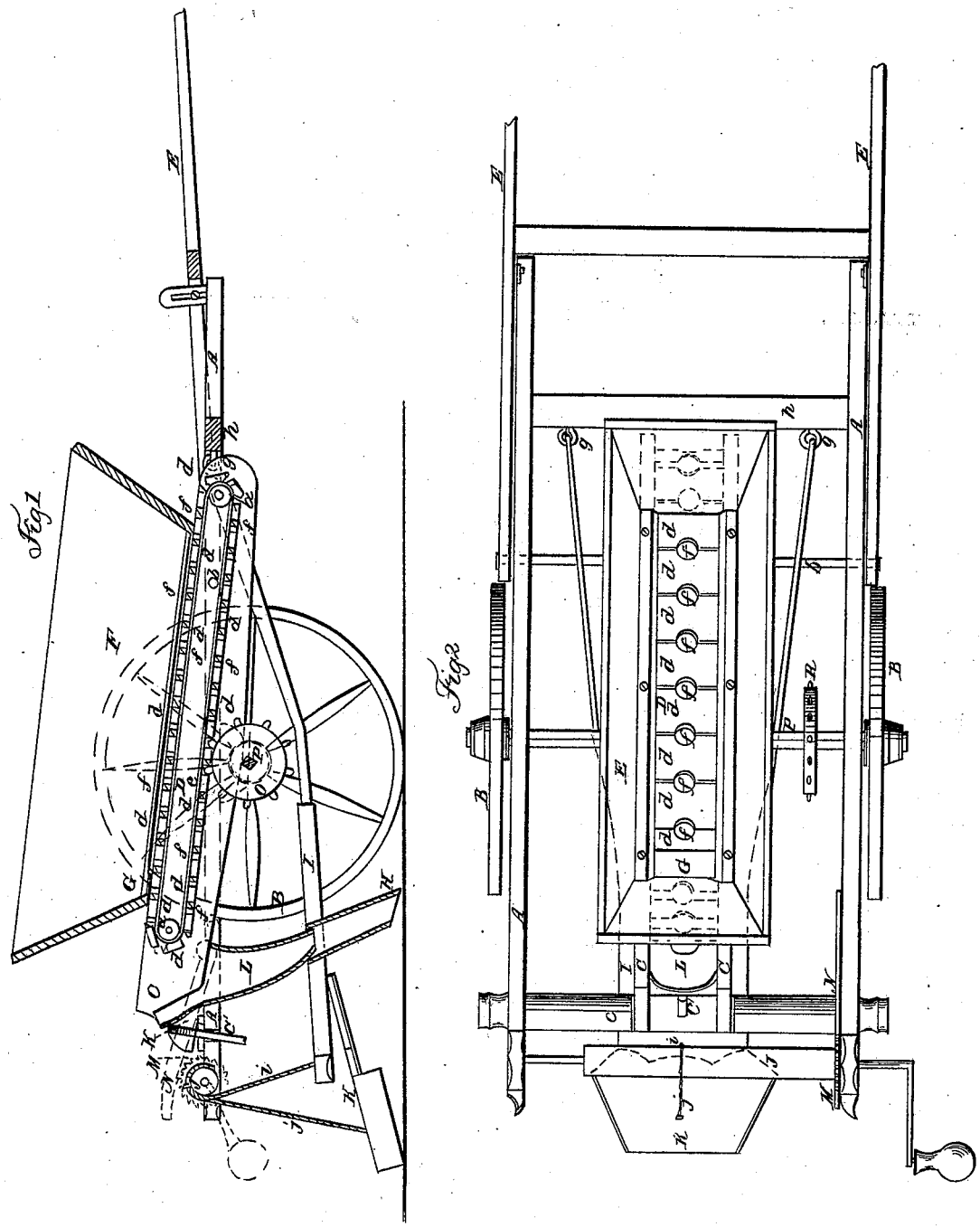

ALEXANDER ANDERSON, OF MARKHAM, CANADA.

IMPROVEMENT IN SEED-PLANTERS.

Specification forming part of Letters Patent No. 12,152, dated January 2, 1855.

*To all whom it may concern:*

Be it known that I, ALEXANDER ANDERSON, of Markham, in the county of York and Province of Canada, have invented a new and Improved Implement or Machine for Planting Potatoes; and I do hereby declare that the following is a full, clear, and exact description of the construction and operation of the same, reference being had to the annexed drawings, making a part of this specification, in which—

Figure 1 is a longitudinal vertical section of my improved machine, the plane of section being through the center. Fig. 2 is a plan or top view of the same.

Similar letters of reference indicate corresponding parts in the two figures.

This invention relates to a new and improved machine for planting potatoes; and it consists in the employment or use of an endless apron placed underneath or at the bottom of a hopper, and provided with a series of apertures, which will be hereinafter fully described, said apertures receiving the potatoes of a suitable size for seed and conveying them to the discharge-spout, through which they fall into the furrow at equal distances apart, said apertures also conveying potatoes that are too large for seed to a knife at the bottom of the hopper, by which they are cut of a suitable size for planting. The apertures in the under side of the apron receive the teeth of a wheel by which motion is communicated to the apron.

To enable others skilled in the art to make and use my invention, I will proceed to describe its construction and operation.

A represents a rectangular frame, supported upon two wheels, B B, and C C are two cheek-pieces, between which an endless apron, D, is placed, said apron passing around rollers *a a* at the front and back ends of the cheek-pieces. The front parts of the cheek-pieces rest upon a rod, *b*, which passes transversely through the frame A and cheek-pieces, about midway between their upper and lower surfaces, said rod also attaching the shafts E E to the frame A, as shown clearly in Fig. 2. The lower surfaces of the back ends of the cheek-pieces rest upon a cross-piece, *c*, of the frame A, and the cheek-pieces and endless apron have an inclined position, as shown clearly in Fig. 1.

C' is a rod having a screw-thread cut on its upper end. This rod fits in a plate, *k*, on the ends of the cheek-pieces, and the rod projects downward a suitable distance below the cross-piece *c*.

The endless apron D is composed of a series of rectangular blocks, *d*, the lower surfaces of which are attached in any proper manner to a belt, *e*, (see Fig. 1,) the edges of the several blocks being in contact, except when passing around the rollers *a a*. Between each two of the blocks a circular aperture, *f*, is made, one-half of the aperture being in the edge of each block. Consequently each block of the apron has a semicircular recess in two of its edges, and these recesses, when the blocks are attached to the belt *e*, form the circular apertures *f*, as clearly shown in Fig. 2.

E is a hopper secured to the upper surfaces of the cheek-pieces C C and directly over the endless apron D.

G is a knife placed at the bottom of the hopper, at its upper or elevated end, said knife passing across the hopper and just above the endless apron D, as shown in Fig. 1.

H, Fig. 1, is the furrow-share, which is formed of a tube having its lower end cut obliquely, so as to form a point to enter the ground. The furrow-share is secured to a frame, I, the front part of which is secured by eyes *g g*, which pass through the ends of the frame I and into a cross-piece, *h*, of the frame A. The back part of the frame I is attached by a chain, *i*, to a roller, J, on the back part of the frame A.

K is the covering-share, which is attached by a hinge or joint to the back end of the frame I. A chain, *j*, connects the covering-share with the roller I.

L is a discharge-spout, the upper end of which is placed directly under the elevated and discharge end of the endless apron D. The spout L conveys the potatoes into the tube of the furrow-share.

M is a ratchet on one end of the roller J, and N is a pawl attached to the frame A, said pawl catching into the teeth of the ratchet.

O is a toothed wheel on the axle P of the wheels B B. The teeth of this wheel fit in the apertures *f* in the endless apron D.

Operation: The hopper F is filled with potatoes, and as the machine is drawn along motion is given the endless apron D by means of the toothed wheel O, gearing in the apertures *f* in the under side of the endless apron. Potatoes of a suitable size for planting will fall into the apertures *f*, and will pass under the knife G and be thrown into the discharge-spout L as the blocks $d$ pass around the roller $a$ at the upper or elevated end of the apron, the apertures being widened as the blocks pass around the roller in consequence of the edges of the blocks being forced apart. (See Fig. 1.) Potatoes that are too large for planting will project upward above the surfaces of the blocks $d$ and will be cut by the knife G, (see $x$, Fig. 1.) The top portion that is cut off will, if small enough, enter one of the apertures $f$ and be discharged into the spout L. If not made small enough at one cutting, it will be again cut when brought to the knife. The pieces of the potato remaining in the apertures are of course discharged as the blocks pass around the roller $a$. The potatoes drop into a furrow made by the share H, and they will be dropped at equal distances apart, the distance between the potatoes being regulated by the size of the wheel O. The larger the wheel O the nearer the potatoes will be planted, and one or more extra wheels of different sizes may be placed in the shaft P and put in gear with the apron as occasion may require. In Fig. 2 an extra wheel, R, is shown upon the shaft P. The elevated ends of the cheek-plates C C are made higher, when larger wheels O are used, by placing blocks upon the cross-piece $c$. The furrow and covering shares H K are raised from the ground by turning the roller J. As the chains $i j$ are wound around the roller J the frame I is raised and will act against the lower end of the rod C' and raise the cheek-pieces C C and endless apron D, and the endless apron will be thrown out of gear with the wheel O, the roller J being prevented from moving casually by means of the pawl N and ratchet M. Thus by the within-described machine the potatoes will be cut the required size and planted at equal distances apart in the furrow. There is no uncertainty attending the operation.

The machine is simple, not liable to get out of repair, and is economical to manufacture.

I do not claim cutting potatoes for planting by means of a horizontal reciprocating knife; but

What I claim as my invention, and desire to secure by Letters Patent of the United States, is—

The peculiar construction of my seed-planter, by which the apertures $f f$ are made to perform the double function of carrying a graduated amount of seed to the discharge-spout, and also to receive the teeth of wheel O, by which motion is communicated to the endless apron, as set forth.

ALEXANDER ANDERSON.

Witnesses:
  HENRY I. HUBERTUS,
  HENRY PINGLE.